(12) United States Patent
Davis-Amendola et al.

(10) Patent No.: US 12,729,627 B2
(45) Date of Patent: Sep. 8, 2026

(54) POLYMERIC FOAMS FOR HOLLOW CAVITIES

(71) Applicant: RTX Corporation, Farmington, CT (US)

(72) Inventors: Kerry Lynn Davis-Amendola, Wethersfield, CT (US); John Harner, Florence, MA (US); David J. Mathiau, Jr., East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/831,769

(22) Filed: Jun. 3, 2022

(65) Prior Publication Data

US 2023/0392504 A1 Dec. 7, 2023

(51) Int. Cl.

| | |
|---|---|
| ***F01D 5/18*** | (2006.01) |
| ***B29C 44/18*** | (2006.01) |
| ***B29L 31/08*** | (2006.01) |
| ***F01D 5/14*** | (2006.01) |
| ***F01D 5/28*** | (2006.01) |

(52) U.S. Cl.

CPC ................ *F01D 5/18* (2013.01); *B29C 44/18* (2013.01); *F01D 5/147* (2013.01); *F01D 5/282* (2013.01); *B29L 2031/082* (2013.01); *F05D 2220/36* (2013.01); *F05D 2230/31* (2013.01); *F05D 2300/612* (2013.01)

(58) Field of Classification Search

CPC . F01D 5/18; F01D 5/147; F01D 5/282; B29C 44/18; F05D 2300/612

See application file for complete search history.

(56) References Cited

U.S. PATENT DOCUMENTS 5,634,771 A * 6/1997 Howard .................. F01D 5/282 416/241 A
5,720,597 A * 2/1998 Wang ...................... F01D 5/288 416/229 A
6,020,387 A * 2/2000 Downey ................. C08K 3/01 524/789

(Continued)

FOREIGN PATENT DOCUMENTS

EP 0808990 A1 11/1997
EP 1447208 A2 8/2004

(Continued)

OTHER PUBLICATIONS

Gazzasni et al (High Temperature Epoxy Foam Optimization of Process Parameters) Jun. 7, 2016, Molecular Diversity Preservation International (Year: 2016).*

(Continued)

*Primary Examiner* — Brian Christopher Delrue
(74) *Attorney, Agent, or Firm* — CANTOR COLBURN LLP

(57) ABSTRACT

A hollow fan blade comprises a sheath, an airfoil and a cover. The sheath forms a pressure side wall and has an exterior surface. The airfoil forms a suction side wall and has an exterior surface. There are a plurality of ribs extending between the pressure side wall and the suction side wall, where the plurality of ribs partition the hollow airfoil into one or more cavities. The cover is disposed in the one or more cavities to protect the plurality of ribs. The cavities are filled with a polymeric foam.

15 Claims, 3 Drawing Sheets

(56) References Cited

U.S. PATENT DOCUMENTS 6,039,542 A * 3/2000 Schilling .................. F01D 5/16
416/232
6,099,257 A * 8/2000 Schilling ............... F04D 29/023
416/241 R
6,282,786 B1 9/2001 Evans et al.
6,287,080 B1 * 9/2001 Evans ..................... B29C 39/10
416/241 A
7,794,197 B2 9/2010 Thompson et al.
7,993,105 B2 8/2011 Weisse et al.
8,083,489 B2 12/2011 Viens et al.
9,453,418 B2 * 9/2016 Hui ......................... F01D 5/282
9,650,897 B2 5/2017 Deal et al.
9,855,628 B2 1/2018 Radomski
10,400,625 B2 9/2019 Cortequisse
10,677,068 B2 6/2020 Hansen et al.
2003/0069321 A1 * 4/2003 Lin ........................... C08J 9/32
521/137
2010/0210745 A1 * 8/2010 McDaniel ................ C09D 7/48
521/55
2011/0194941 A1 * 8/2011 Parkin .................. F04D 29/023
416/224
2011/0211965 A1 * 9/2011 Deal ......................... F02K 3/04
416/223 R
2012/0152893 A1 * 6/2012 Parkos .................... F01D 5/005
156/60
2015/0267541 A1 * 9/2015 Hui ......................... F01D 5/282
29/889.71
2015/0377031 A1 * 12/2015 Cosby ..................... F01D 5/147
416/232
2016/0228913 A1 * 8/2016 Noraas ....................... C08J 9/36
2017/0370375 A1 12/2017 Quinn et al.

FOREIGN PATENT DOCUMENTS

EP 3260659 B1 9/2019
GB 2254382 A 10/1992
WO 2015085078 A1 6/2015
WO WO-2022023903 A1 * 2/2022 .............. C08L 83/04

OTHER PUBLICATIONS

Ultem® 2300 Data Sheet _ Plastic Machining Inc_ Wayback Capture 2016 (Year: 2016).*
Shutov, F.A. (1986). Syntactic polymer foams. In: Chromatography/ Foams/Copolymers. Advances in Polymer Science, vol. 73/74. Springer, Berlin, Heidelberg. https://doi.org/10.1007/3-540-15786-7_7 (Year: 1986).*
Extended European Search Report for EP Application No. 23177294.8; Report mail date, Oct. 26, 2023, (9 pages).
Afolabi et al. "Syntactic foams formulations, production techniques, and industry applications: A review" Journal of Materials Research and Technology 9.5 (Sep. 2020) pp. 10698-10718.
Park et al. "Design and numerical analysis of syntactic hybrid foam for superior sound absorption" Materials & Design 142 (Mar. 2018) Abstract Only 2 pages.
Office Action issued in European Patent Application No. 23177294.8; Date of Mailing Feb. 23, 2026 (5 pages).

* cited by examiner

POLYMERIC FOAMS FOR HOLLOW CAVITIES

BACKGROUND

Disclosed herein are polymeric foams for hollow cavities. More specifically, disclosed herein are methods of manufacturing hollow fan and compressor blades that are filled with polymeric foams.

A gas turbine engine, such as a turbo fan engine for an aircraft, includes a fan section, a compression section, a combustion section and a turbine section. An axis of the engine is centrally disposed within the engine and extends longitudinally through the sections. The primary flow path for working medium gases extends axially through the sections of the engine. A secondary flow path for working medium gases extends parallel to and radially outward of the primary flow path.

The fan section includes a rotor assembly and a stator assembly. The rotor assembly of the fan includes a rotor disc and plurality of radially extending fan blades. The fan blades extend through the flow path and interact with the working medium gases and transfer energy between the fan blades and working medium gases. The stator assembly includes a fan case, which circumscribes the rotor assembly in close proximity to the tips of the fan blades.

During operation, the fan draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

Minimizing engine weight for an aircraft application is a design objective. However, weight reduction is itself limited by the requirement to maintain component strength under the various loads experienced during operation.

For example, the fan blades are relatively large and generate significant centrifugal force during rotor operation. The blades must be designed to withstand both centrifugally induced loads and stress as well as aerodynamic loads as ambient air is pressurized for generating propulsion thrust. In addition, these fan blades should be capable of ingesting a medium-sized bird while allowing for continued operation or safe and orderly shutdown of the engine. Another reason is that these blades should resist cracking from nicks and dents caused by small debris such as sand and rain.

Maximum fan blade size is limited by the high strength materials available for the manufacture thereof, and the associated cost of manufacture. Metal alloys (e.g., titanium and titanium alloys) and fiber composites are generally classes of materials for fan and compressor blades in commercial airline engines.

In order to reduce weight, the fan blades in some gas turbine engines are hollow. The hollow blades are sometimes filled with porous metals. The porous metal provides the hollow fan and compressor blades with the strength and light weight to meet some of the aforementioned desired characteristics.

Despite the reduction in weight and improvement in strength by filling the fan and compressor blades with porous metals, it is desirable to further reduce weight (of the blades) while retaining mechanical properties.

SUMMARY

A hollow fan blade comprises a sheath, an airfoil and a cover. The sheath forms a pressure side wall and has an exterior surface. The airfoil forms a suction side wall and has an exterior surface. There are a plurality of ribs extending between the pressure side wall and the suction side wall, where the plurality of ribs partition the hollow airfoil into one or more cavities. The cover is disposed in the one or more cavities to protect the plurality of ribs. The cavities are filled with a polymeric foam.

In an embodiment, the polymeric foam contacts an inner surface of the one or more cavities and also contacts the cover and the airfoil.

In another embodiment, the polymeric foam comprises a thermoplastic or thermosetting organic polymer.

In another embodiment, the polymeric foam has a density of 0.1 to 0.8 grams per $cm^3$.

In another embodiment, the polymeric foam comprises a syntactic foam.

In another embodiment, the thermoplastic foam comprises polyetherketones, polyetherimides, polyurethanes, polysulfones, polyimides, polyaramides, or a combination thereof.

In yet another embodiment, the thermosetting foam comprises phenolics, epoxies, polyesters, polyurethanes, or a combination thereof.

In another embodiment, the polymeric foam has a glass transition temperature of greater than or equal to 100° C.

In another embodiment, the polymeric foam has a glass transition temperature of greater than or equal to 200° C.

In another embodiment, the polymeric foam has a glass transition temperature of greater than or equal to 250° C.

In another embodiment, the polymeric foam comprises an amorphous polymer.

In another embodiment, the polymeric foam comprises a crosslinked polymer.

A method comprises disposing in a cavity of a hollow fan blade an organic polymer-blowing agent combination and expanding an organic polymer of the organic polymer-blowing agent combination to form a foam. The hollow fan blade comprises an airfoil and a sheath, where the airfoil and the sheath contact each other.

The airfoil comprises cavities and has a cover disposed in the cavities to protect a plurality of ribs.

In an embodiment, the organic polymer is foamed by changing the temperature and/or pressure of the organic polymer-blowing agent combination.

In another embodiment, a blowing agent of the organic polymer-blowing agent combination comprises a physical blowing agent.

In yet another embodiment, a blowing agent of the organic polymer-blowing agent combination comprises a chemical blowing agent.

In yet another embodiment, the organic polymer-blowing agent combination is a two-part polymer film that when heated initiates a chemical reaction that forms the foam.

In yet another embodiment, the thermoplastic organic polymer comprises polyetherketones, polyetherimides, polyurethanes, polysulfones, polyimides, polyaramides, or a combination thereof.

In yet another embodiment, the thermosetting organic polymer comprises phenolics, epoxies, polyesters, polyurethanes, or a combination thereof.

In yet another embodiment, the polymeric foam contacts an inner surface of the cavity.

DETAILED DESCRIPTION

Disclosed herein are hollow cavities of fan blades that are filled with polymeric foams. More specifically, disclosed herein are hollow cavities in fan and/or compressor blades (hereinafter fan blades) that are filled with polymeric foams. The fan blades detailed herein include a combination of an airfoil with cavities, a cover disposed in the airfoil and a sheath. In a preferred embodiment, the hollow cavities are filled with syntactic polymeric foams. The syntactic polymeric foams are disposed in the hollow cavity and expand to contact the walls that surround the cavity. These foams provide the walls (that surrounds the cavities) with strength while not significantly changing the weight of the structure. In addition, these foams contact the walls of the cavity and remain bonded to the walls despite the difference in the coefficient of thermal expansion between the walls and the foam. In an embodiment, the structure of the foams and their flexibility permits the foam to be bonded to the walls of the airfoil, the one or more covers and the sheath despite their differences in coefficients of thermal expansion.

In an embodiment, an organic polymer-blowing agent combination is disposed in the cavities of the airfoil. When the temperature and/or pressure of the organic polymer-blowing agent combination is changed, the organic polymer expands to form a foam. In an embodiment, the temperature of the organic polymer-blowing agent combination is increased to facilitate the formation of the foam. In another embodiment, the pressure of the organic polymer-blowing agent combination is reduced to facilitate the formation of the foam. The organic polymer may also undergo crosslinking during or after the formation of the foam. The organic polymer also undergoes bonding to the walls of the cavities, cover and/or airfoils. This bonding may include covalent bonding, ionic bonding, or a combination thereof.

Syntactic foam is a class of material created using preformed hollow spheres (commonly made of glass, ceramic, polymer or even metal) bound together with a polymer. The "syntactic" portion refers to the ordered structure provided by the hollow spheres. The "foam" term relates to the cellular nature of the material. They also provide strength and structural integrity at a significantly lower weight per volume than most traditional materials. This makes them attractive for use in fan blade applications. In an embodiment, the syntactic foam can provide the cavity with the properties of certain types of metal foams.

Figure 1:
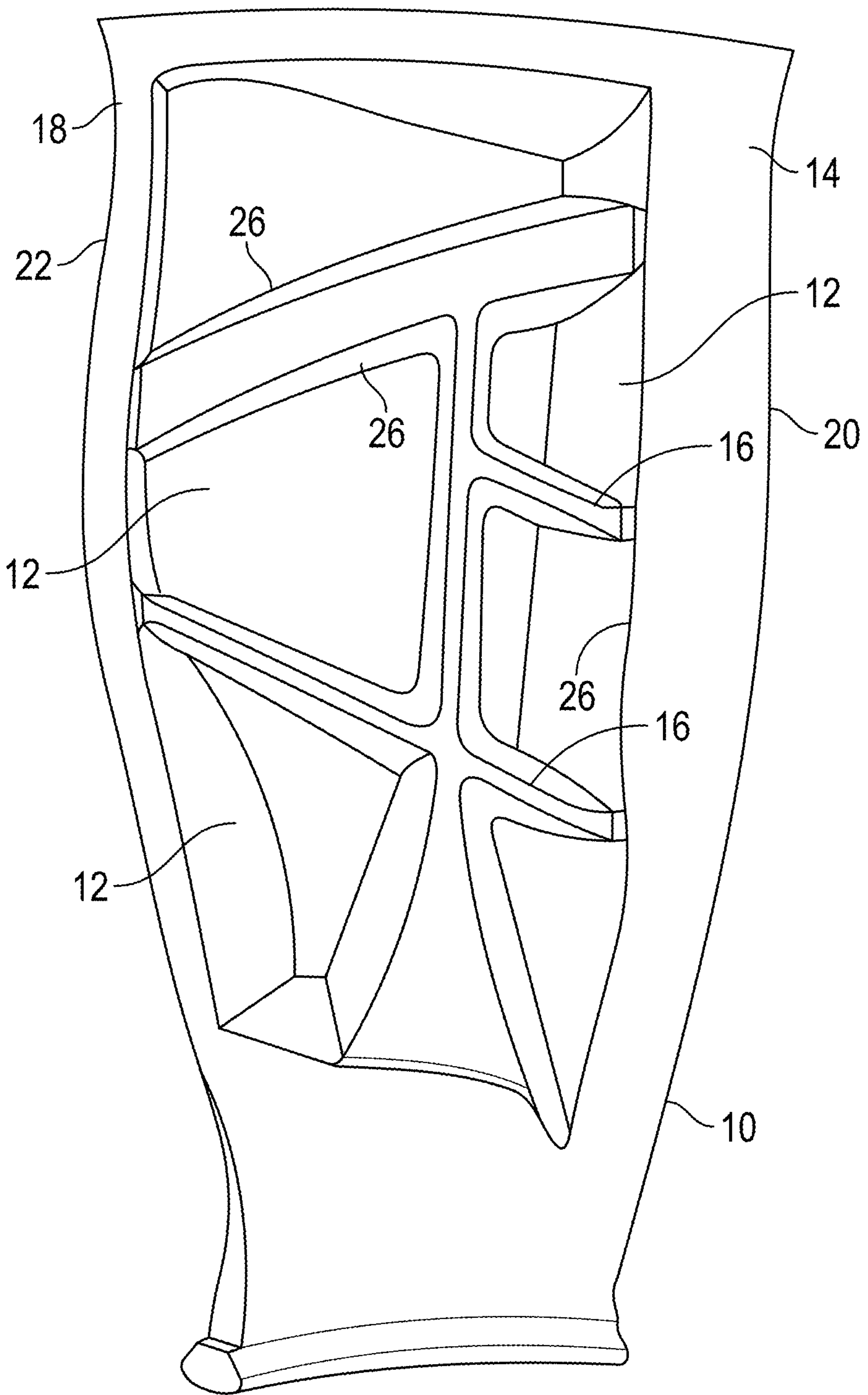
FIG. 1 depicts an exemplary aircraft engine fan blade with cavities that may be filled with a polymeric foam.

FIG. 1 depicts an exemplary aircraft engine hollow airfoil 10. As noted above, the fan blade comprises the hollow airfoil along with the sheath (depicted in the FIG. 2). The hollow airfoil contains cavities that are sized to receive one or more covers (depicted in the FIG. 3). The one or more covers protect the ribs. The hollow airfoil 10 includes a pressure side wall 14 and a suction side wall 18 separated and supported by ribs 16. The hollow airfoil 10 comprises a metal, typically a titanium alloy such as Ti 6-2-4-2 or aluminum. Six cavities 12 typically are manufactured into the concave (pressure) side 14, as shown in FIG. 1. The number of cavities is dependent upon the configuration and size of the airfoil, and fewer or more cavities may be included as desired.

As may be seen in the FIG. 1, the pressure side wall 14 and the suction side wall 18 have respective exterior surfaces 20 and 22. The plurality of ribs extend between the pressure side wall and the suction side wall and partition the hollow fan blade into a number of hollow cavities 12 that are filled with the polymeric foam (not shown). The polymeric foam (not shown) contacts the inner surfaces 26 of the cavities 12. The cavities may be formed in the airfoil by any conventional means, such as by machining. Conveniently, the airfoil may be forged or cast with the cavities being an integral part of the forged or molded configuration.

Figure 2:
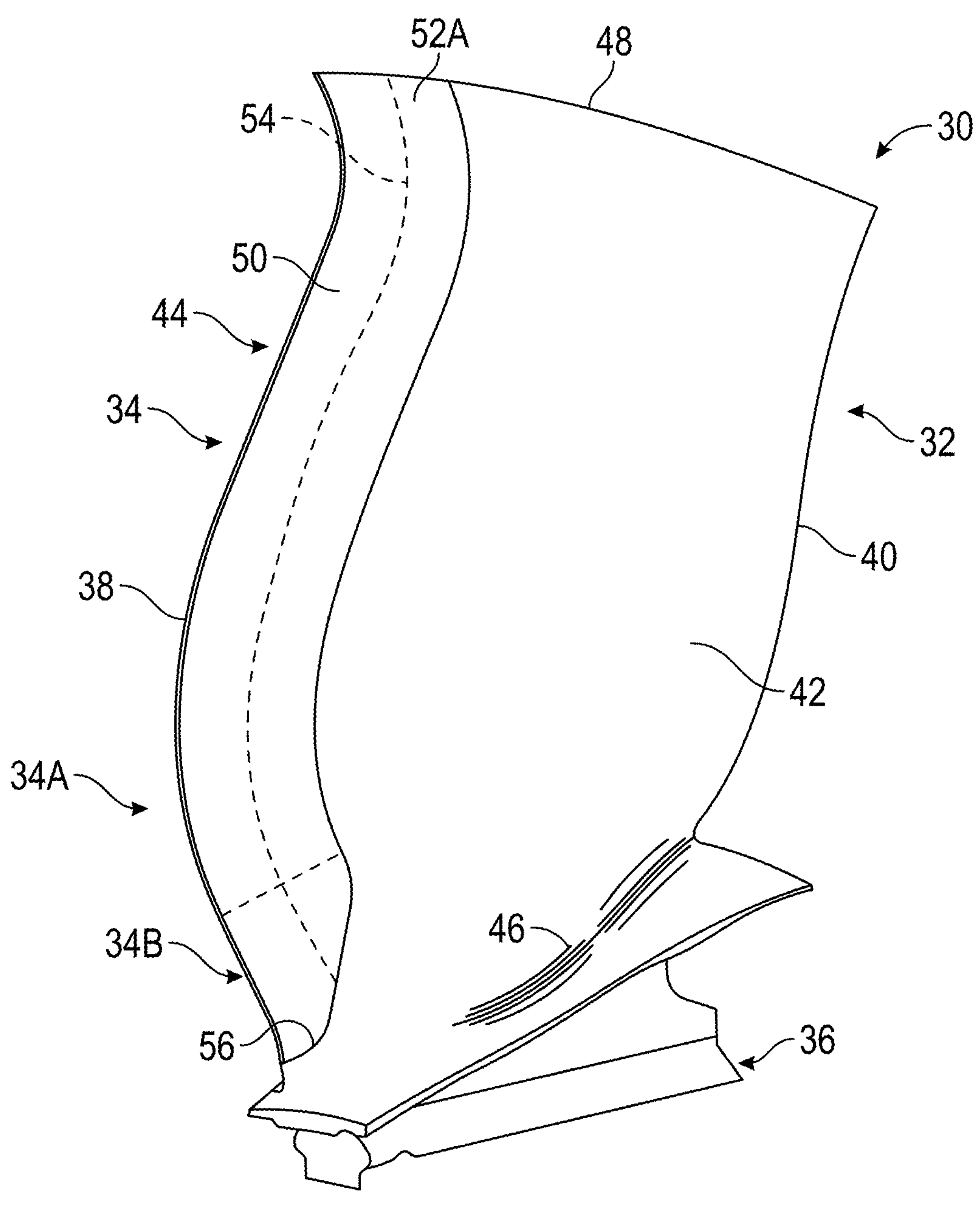
FIG. 2 is an exemplary depiction of the various parts that form the fan blade, which include an airfoil, a sheath and root.
Figure 3:
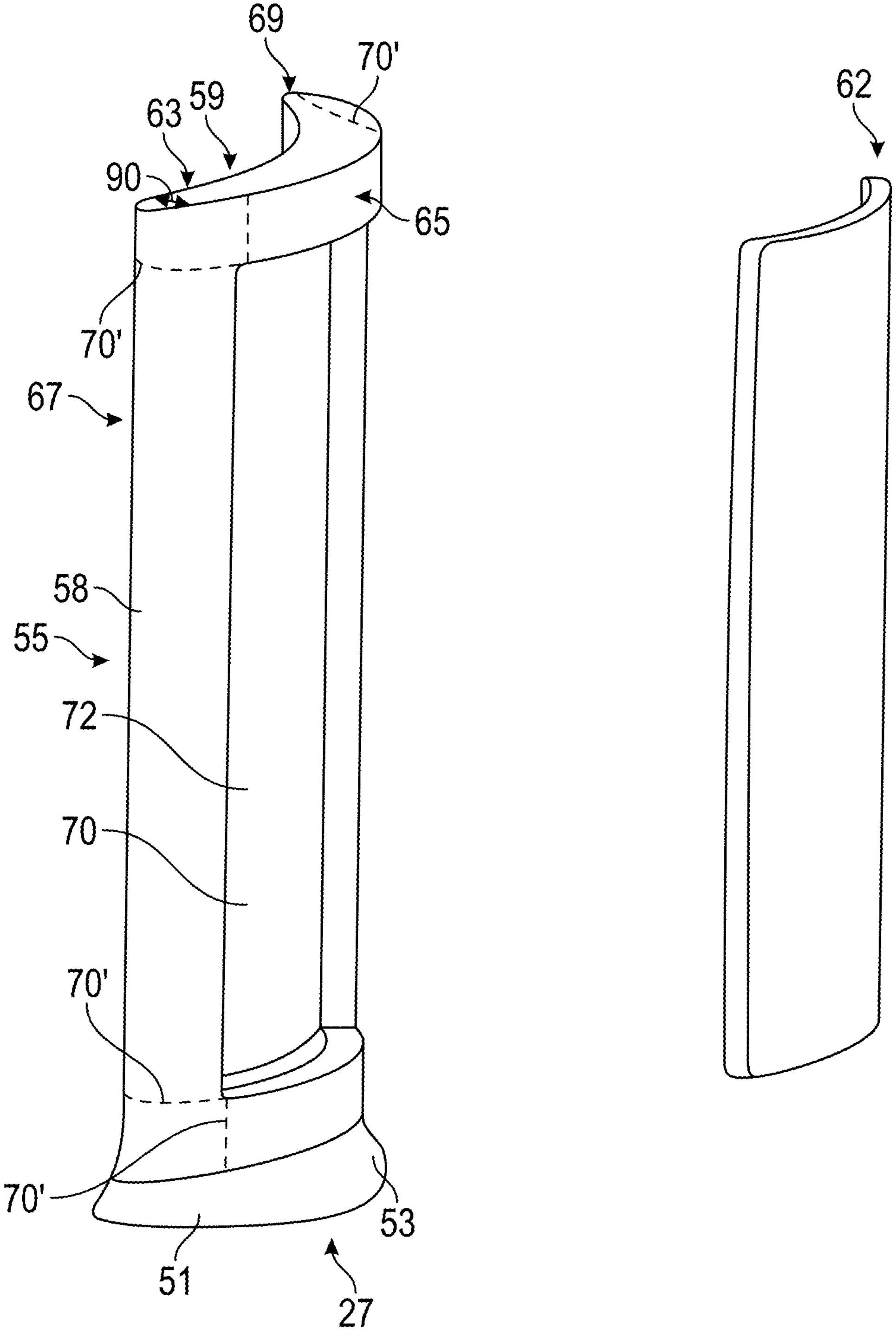
FIG. 3 depicts a cover that is fitted into the cavities of the airfoil to protect the ribs in the airfoil.

A side view of exemplary fan blade 30 is shown in FIGS. 2 and 3. As seen in FIGS. 2 and 3, the various parts joined to form the fan blade 30 include an airfoil 32, a sheath 34, and root 36. In FIG. 3 a cover 62 is fitted into the cavities of the airfoil and is used to protect the ribs in the airfoil. This will be discussed later.

With reference to the FIG. 2, fan blade 30 has inner and distal spanwise sheath sections 34A and 34B, respectively, leading edge 38, trailing edge 40, and suction surface 42. Fan blade 30 also includes platform 46, tip edge 48, sheath head section 50, sheath flank 52A, along with forward airfoil edge 54 and sheath inner end 56. Pressure surface 44 is at the rear of the fan blade 30.

Leading edge 38 and trailing edge 40 extend generally spanwise in a curved manner from platform 46 to tip edge 48. Air flows chordwise from leading edge 38 over suction surface 42 and pressure surface 44, meeting at trailing edge 40. Root 36 links fan blade 30 at platform 46 to a disk or rotor (not shown).

FIG. 3 depicts another embodiment of a fan blade 27 that comprises an air foil 55 that includes a root 51 supporting a root neck 53. The airfoil 55 extends from the root neck 53 to a tip 59. The airfoil 55 includes a body 58 having spaced apart leading and trailing edges 67, 69. Pressure and suction sides 63, 65 adjoin the leading and trailing edges 67, 69.

The body 58 includes a cavity 70 between the leading and trailing edges 67, 69. In this example, the cavity 70 is disposed in the suction side 65 of the airfoil 55. However, the cavity 70 may alternatively be disposed in the pressure side 63 of the airfoil 55. The cavity 70 is sized to receive a cover 62. The cover 62 protects the ribs (not shown) of the airfoil 55. Although only one cavity 70 and corresponding cover 62 are shown, multiple cavities with multiple covers may be used depending on system requirements.

The cavity 70 is spaced inwards of the leading and trailing edges 67, 69 as well as radially inwards of the root neck 53 and tip 59. However, the cavity 70 may extend to any of the tip 59, leading edge 67, trailing edge 69 and root neck 53, as shown by cavity 70', shown in phantom. The body 58 forms an inner wall 72 of the cavity 70.

The foam is disposed in the fan blade such that it fills the cavities and contacts the walls of the airfoil, the first and second covers as well as the walls of the sheath. The foam is preferably a polymeric foam that comprises an organic polymer. Organic polymers used in the cavities may be selected from a wide variety of thermoplastic polymers, blend of thermoplastic polymers, thermosetting polymers, or blends of thermoplastic polymers with thermosetting polymers. The organic polymer may also comprise a blend of polymers, copolymers, terpolymers, or a combination thereof.

The organic polymer may also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

The organic polymer may be amorphous or semicrystalline. The organic polymers preferably have a glass transition temperature greater than or equal to about 100° C., preferably greater than or equal to 200° C., and more preferably greater than or equal to about 250° C. The glass transition temperature is measured using differential scanning calorimetry at a rate of temperature increase of 10° C./minute.

Exemplary organic polymers include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyguinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

Preferred thermoplastic foams include polyetherketones, polyetherimides, polyurethanes, polysulfones, polyimides, polyaramides, or the like, or a combination thereof.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof. The thermosetting polymers undergo curing after being activated with an initiator that promotes crosslinking. In some cases, the temperature of the polymer is elevated to facilitate the crosslinking.

Preferred polymers for use in the cavities of the airfoil are phenolics, epoxies, polyesters, polyurethanes, or a combination thereof. An exemplary polymer for use in the foam is a syntactic expanding thermosetting epoxy polymer. The polymer is preferably amorphous and is crosslinked.

In one embodiment, in one method of manufacturing the airfoil, the airfoil with the cavities may first be manufactured using casting or forging. A sheath may also be manufactured using casting or forging. The cavities of the airfoil may be filled with the desired foam. The sheath contacts the airfoil to form the fan blade. The foam may be inserted into the cavities in a variety of different ways. The foam that is inserted into the fan blade contacts the walls of the airfoil and the sheath.

In an embodiment, the foam may be first manufactured by mixing the polymer with a suitable blowing agent such that the polymer-blowing agent combination exists in a single phase. The polymer-blowing agent combination is retained at a pressure and temperature that is effective to retain the combination in a single phase until the combination is ready for use. When desired, the combination is disposed in the cavities of the hollow airfoil and the pressure and/or temperature is changed to facilitate binodal decomposition which results in the nucleation and growth of cells in the polymer to form the foam. In an embodiment, the combination may be pumped into or poured into the cavities of the hollow airfoil. When the pressure and/or temperature in the cavities is changed, the blowing agent nucleates and grows in the polymer matrix resulting in the formation of a polymeric foam.

The blowing agent can be a physical blowing agent or a chemical blowing agent. Physical blowing agents typically undergo phase separation from the organic polymer (in which they are dissolved) upon experiencing a change in environmental conditions to produce the foam, while chemical blowing agents are those that undergo reaction or decomposition upon experiencing a change in environmental conditions to release a gas, which results in the formation of the foam. The physical and/or chemical blowing agent may be present in the organic polymer prior to the insertion of the organic polymer into the hollow airfoil.

A blowing agent is a substance which is capable of producing a cellular structure via a foaming process in a variety of materials that undergo hardening or phase transition, such as organic polymers or metals. They are typically applied when the blown material (e.g., the organic polymer) is in a liquid or molten stage. The cellular structure in the polymer reduces density while increasing relative stiffness of the original organic polymer.

Blowing agents or related mechanisms to create holes in a matrix producing cellular materials, have been classified as follows:

Physical blowing agents include chlorofluorocarbons (CFCs), hydrochlorofluorocarbons (HCFCs), hydrocarbons (e.g., pentane, butane, isopentane, cyclopentane, or the like), and liquid or supercritical carbon dioxide.

Examples of suitable physical blowing agents may be methyl fluoride, methyl chloride, difluoromethane, methylene chloride, perfluoromethane, or the like; hydrocarbons such as acetylene, ammonia, butane, butene, isobutane, isobutylene, propane, dimethylpropane, ethane, methane, trimethylamine, pentane, cyclopentane, hexane, propane, propylene, alcohols, ethers, ketones; or the like, or a combination thereof.

The bubble/foam-making process (using physical blowing agents) is irreversible and endothermic, i.e., it needs heat (e.g., from a melt process or the chemical exotherm due to cross-linking) and/or a change in pressure, to volatilize the liquid blowing agent. Useful physical blowing agents have a boiling point between about −50° C. and about 100° C. and preferably between about −25° C. and about 50° C. Physical blowing agents may be used in gaseous and/or liquid state.

Chemical blowing agents include isocyanate and water for polyurethane, azodicarbonamide for vinyl, hydrazine and other nitrogen-based organic polymers for thermoplastic and elastomeric polymeric foams, and sodium bicarbonate for other thermoplastic polymeric foams. Gaseous products and other byproducts are formed by a chemical reaction of the chemical blowing agent, promoted by the heat of the foam production process or a reacting polymer's exothermic heat. Since the blowing reaction occurs forming low molecular weight compounds acting as the blowing gas, additional exothermic heat is also released.

Examples of suitable chemical blowing agents include azodicarbonamide, p-toluene sulfonyl hydrazide, p-toluene sulfonyl semicarbazide, 5-phenyltetrazole, ethyl-5-phenyltetrazole, or the like, or a combination thereof.

Mixed physical/chemical blowing agents may also used to produce foamed organic polymers. Here both the chemical and physical blowing agents are used in tandem to balance each other out with respect to thermal energy released and absorbed, thereby minimizing temperature rise in the organic polymer and preventing thermal degradation of the organic polymer.

In another embodiment, a thermally expandable microsphere can be used as the blowing agent. The microsphere is formed of a gas proof polymeric shell (e.g., polyacrylonitrile or polyvinylidene chloride) that encapsulates a (cyclo)aliphatic hydrocarbon (e.g., liquid isobutene). When the thermally expandable microspheres are subjected to temperatures of about 50° C. to about 200° C., the polymeric shell softens and the (cyclo)aliphatic hydrocarbon expands, thereby promoting an increase in the volume of the microspheres. When expanded, the microspheres have a diameter 3.5 to 4 times their original diameter, as a consequence of which their expanded volume is about 50 to 60 times greater than their initial volume in the unexpanded state. An example of such thermally expandable microspheres are the EXPANCEL® DU microspheres which are marketed by NOURYON Industries.

In one embodiment, the microspheres are unexpanded or partially unexpanded microspheres consisting of small spherical particles with an average diameter of typically 10 to 15 micrometers.

In an embodiment, the microspheres are incorporated into the organic polymeric coating that undergoes expansion as the microspheres expand. The organic polymeric coating is a thermosetting polymer and can undergo crosslinking after being expanded by the microspheres. Thermosetting polymers are listed above and will not be elaborated upon again. Both the expansion and the curing can be conducted after the microspheres and the organic thermosetting polymer are mixed and disposed into the cavities of the airfoil.

In an embodiment, the foam is produced by an organic polymer-blowing agent combination that is in the form of a two-part polymer. The two-part polymer includes polymers that are pre-staged into thin films. Upon heating to temperatures in excess of 200° F., the polymer films soften, mix and begin to chemically react creating polymeric cross-links and producing a blowing agent capable of foaming the two-part polymer. The foamed two-part polymer fills the cavity.

In order to produce the foam, the temperature of the polymer-binding agent combination is raised to a temperature of greater than 75° C., preferably greater than 100° C., and more preferably greater than 125° C. at ambient pressure conditions. The foam is formed at elevated temperatures because of an expansion of the blowing agent. The foam may also be cured during the expansion of the blowing agent.

The foaming may occur prior to curing. In another embodiment, the foaming may occur simultaneously with curing.

In an embodiment, the foam present in the cavities may be an open cell foam, a closed cell foam, or a combination thereof. The foam typically has mechanical properties that are equivalent to metal foams though they may have densities less than the metal foams.

The foam cells may have an average cell size of 2 to 100 micrometers, preferably 5 to 50 micrometers and more preferably 10 to 30 micrometers. In an embodiment, the foam has a density of 0.2 grams per $cm^3$ to 0.8 grams per $cm^3$, preferably 0.25 to 0.65 grams per $cm^3$.

In an embodiment, the polymeric foams contained in the cavities may contain fillers such as glass beads, glass and/or carbon fibers, additives such as antioxidants, antiozonants, thermal stabilizers, colorants, or the like, or a combination thereof.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A hollow fan blade comprising:

a sheath, wherein the sheath forms a pressure side wall having an exterior surface;

an airfoil, wherein the airfoil forms a suction side wall having an exterior surface;

a plurality of ribs within the airfoil extending between the pressure side wall and the suction side wall, where the plurality of ribs partition an interior of the airfoil into one or more cavities;

a cover disposed in the cavities to protect the plurality of ribs; and a syntactic polymeric foam disposed in the cavities and bonded to the cover, the syntactic polymeric foam including a thermally expandable microsphere and formed by expanding an organic polymer-blowing agent combination in the cavity, the organic polymer-blowing agent combination comprising a thermoplastic organic polymer and the thermally expandable microsphere, wherein expanding the organic polymer-blowing agent combination includes expanding the thermally expandable microsphere.

2. The hollow fan blade of claim 1, wherein the polymeric foam contacts an inner surface of the one or more cavities and also contacts the cover and the airfoil.

3. The hollow fan blade of claim 1, wherein the polymeric foam comprises a thermoplastic or thermosetting organic polymer.

4. The hollow fan blade of claim 1, wherein the polymeric foam has a density of 0.1 to 0.8 grams per $cm^3$.

5. The hollow fan blade of claim 1, wherein the polymeric foam has a glass transition temperature of greater than or equal to 100° C.

6. The hollow fan blade of claim 1, wherein the polymeric foam has a glass transition temperature of greater than or equal to 200° C.

7. The hollow fan blade of claim 1, wherein the polymeric foam has a glass transition temperature of greater than or equal to 250° C.

8. The hollow fan blade of claim 1, wherein the polymeric foam comprises an amorphous polymer.

9. The hollow fan blade of claim 1, wherein the polymeric foam comprises a crosslinked polymer.

10. A method comprising:

disposing an organic polymer-blowing agent combination in a cavity of a hollow fan blade, the hollow fan blade comprising an airfoil, a sheath and a cover, where the airfoil and the sheath contact each other and where the airfoil comprises a plurality of ribs that define the cavity, and wherein the cover protects the plurality of ribs, the organic polymer-blowing agent combination including an organic polymer and a thermally expandable microsphere; and expanding an organic polymer-blowing agent combination to form a polymeric foam, the polymeric foam comprising a syntactic foam that bonds to the cover, wherein the organic polymer-blowing agent combination includes a thermoplastic organic polymer and a thermally expandable microsphere, wherein expanding the organic polymer-blowing agent combination includes expanding the thermally expandable microsphere.

11. The method of claim 10, wherein the expanding the organic polymer is accomplished by changing the temperature and/or pressure of the organic polymer-blowing agent combination.

12. The method of claim 10, wherein a blowing agent of the organic polymer-blowing agent combination comprises a physical blowing agent.

13. The method of claim 10, wherein a blowing agent of the organic polymer-blowing agent combination comprises a chemical blowing agent.

14. The method of claim 10, wherein the organic polymer-blowing agent combination is a two-part polymer film that when heated initiates a chemical reaction that forms the foam.

15. The method of claim 14, wherein the polymeric foam contacts an inner surface of the cavity.

* * * * *